D. A. GRIEB.
STORAGE BATTERY SEPARATOR.
APPLICATION FILED MAY 24, 1920.
1,362,289.
Patented Dec. 14, 1920.
2 SHEETS—SHEET 1.
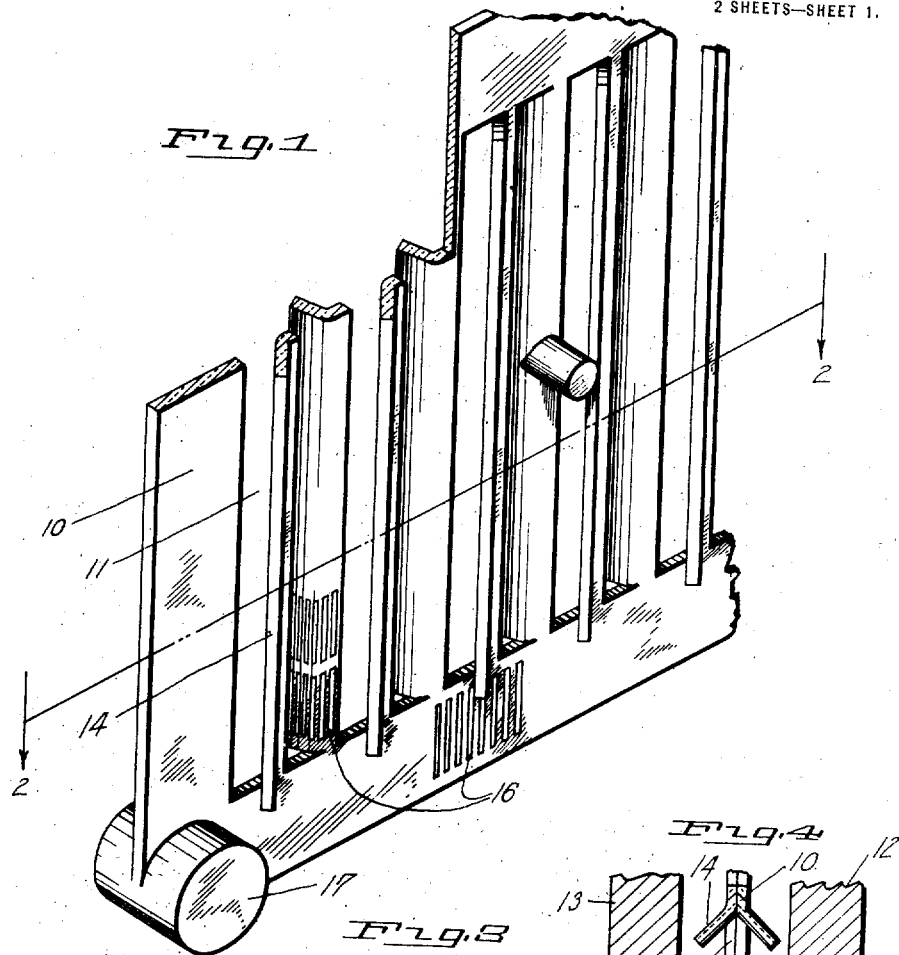
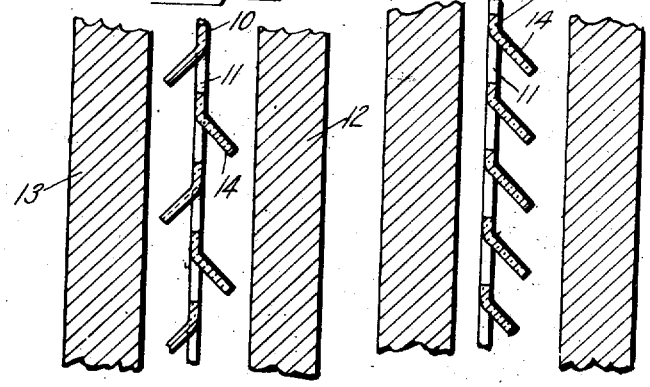
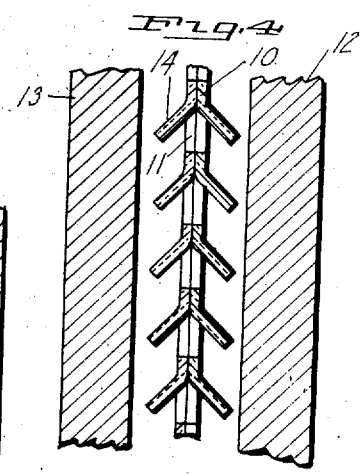
Inventor
DANIEL A. GRIEB.
By
Hood & Schley
Attorneys

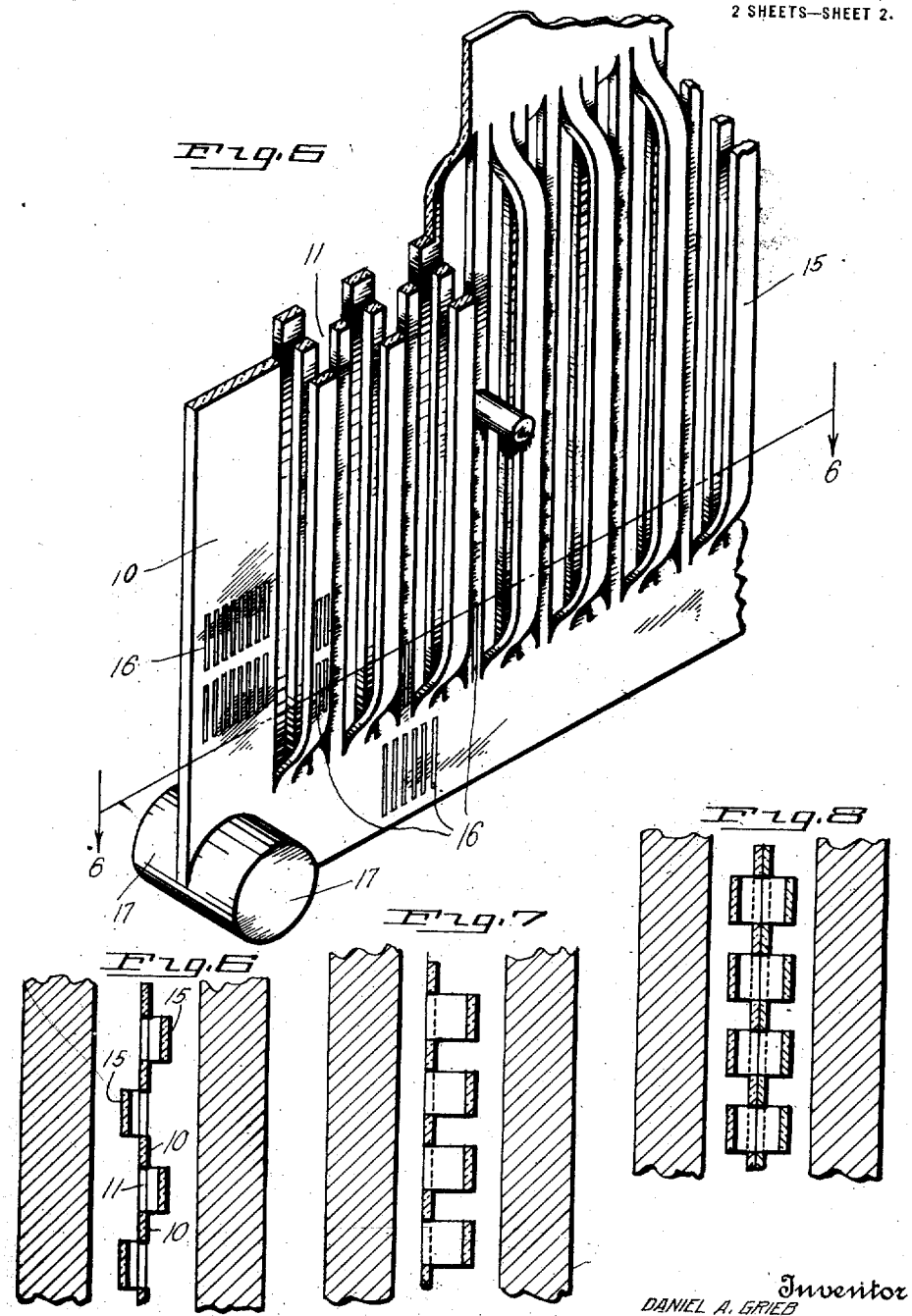

UNITED STATES PATENT OFFICE.

DANIEL A. GRIEB, OF INDIANAPOLIS, INDIANA.

STORAGE-BATTERY SEPARATOR.

1,362,289.  Specification of Letters Patent.  Patented Dec. 14, 1920.

Application filed May 24, 1920. Serial No. 383,967.

*To all whom it may concern:*

Be it known that I, DANIEL A. GRIEB, a citizen of the United States, residing at Indianapolis, in the county of Marion and State of Indiana, have invented a new and useful Storage-Battery Separator, of which the following is a specification.

It is the object of my invention to provide a storage-battery separator which will allow the free migration of the ions but will resist the battery acid and will effectively prevent bridging across of the active material between plates with the consequent formation of internal short-circuits.

In carrying out my invention, I make separators of acid-resisting material primarily in sheet form, such as rubber, celluloid or other synthetic acid-resisting compounds, with slots or other openings formed through it to permit the ion migration, but with portions offset from the main plane of the sheet to form guards for such openings, whereby the ion migration is not interfered with but is required to be in a more or less crooked path which effectively prevents the bridging across of the active material. Such a sheet may be used singly or in groups; and the offset portions may be formed in it in various ways, as by pressing or molding, and may be on one or both sides of the sheet. The separators are preferably spaced from the battery plates throughout the most of their surface, but have suitable projecting buttons, which may or may not be formed integral with the sheets, which engage the battery plates at suitable points and effectively prevent buckling of the latter.

The accompanying drawings illustrate my invention: Figure 1 is a fragmentary perspective view of a battery separator embodying my invention in one form; Fig. 2 is a horizontal section on the line 2—2 of Fig. 1; Fig. 3 is a section substantially like Fig. 2 but showing the projections all on one side of the sheet; Fig. 4 is a section something like Fig. 2, but showing a separator made up of plates like that of Fig. 3; Fig. 5 is a fragmentary perspective view somewhat similar to Fig. 1, but showing a somewhat different form of separator, with the projections joined at their ends to the body of the separator instead of being joined along an edge as in the arrangement shown in Fig. 1; Fig. 6 is a horizontal section on the line 6—6 of Fig. 5; and Fig. 7 is a section similar to Fig. 6, but with the projections all offset on one side of the body of the separator; and Fig. 8 is a section built up of two plates like that of Fig. 7.

The separator in its simplest form is made of a single sheet 10 of suitable acid-resisting material, such as rubber, celluloid, bakelite, or redmanol, which may be furnished in sheet form and afterward manipulated to form the desired openings and projections, or may be molded originally in the desired form. Formed in this sheet are suitable openings 11 to permit the migration of the ions. These openings 11 are most conveniently in the form of long slots, shown as vertical, though not necessarily so, when the separator is in place in the battery between adjacent battery plates 12 and 13 as illustrated in Figs. 2, 3, 4, 6, 7, and 8. The openings 11 are protected by offset portions from the main body of the plates 10.

These offset portions may take the form of oblique wings 14, which are joined at one edge to the body of the plate 10 at the edge of the respective openings 11, and project obliquely from the plane of the plate 10 in front of the openings 11. This form is shown in Figs. 1, 2, 3, and 4. The wings 14 may be on both sides of the plates 10, as shown in Figs. 1 and 2, or may be on only one side thereof, as shown in Fig. 3. The separator may be formed of a single plate, as shown in Figs. 1, 2, and 3, or may be formed of two or more plates put together in any desired arrangement. One such arrangement is shown in Fig. 4, where two plates similar to the one shown in Fig. 3 with the wings 14 all projecting on one side are put together with their flat faces abutting and their openings 11 registering, so that the two plates together form a single separator with each opening 11 protected by a wing 14 on each side of the separator. The scheme of putting two plates together with flat faces abutting and openings registering shown in Fig. 4 is but one way of putting together two such plates to form a single separator.

The offset portions, instead of being in the form of oblique wings 14 as in Figs. 1, 2, 3, and 4, may be in the form of strips 15 parallel to the plate 10 and wholly offset from the plane of such plate in the transverse plane of the respective openings, on either one or both sides, and joined to the body of the plate at their ends. Plates with such offset strips guarding the openings 11 are shown in Figs. 5, 6, 7, and 8. In Figs. 5 and 6, such strips 15 for alternate openings 11 are offset on opposite sides of the plate 10, while in Fig. 7 such strips are all offset on the same side of the plate 10. Plates of this sort may also be assembled in groups to form a single separator. One such assembled arrangement is shown in Fig. 4, where two plates each having offset strips 15 all on one side are put together with their flat faces abutting, and their openings 11 registering, so that each opening is protected by a guard strip 15 on each side of the plate.

All the forms shown can be made from a flat sheet, with the wings 14 or strips 15 merely pressed laterally out of the plane of the sheet, such wings or strips being formed by the material originally filling the slots 11. As stated, however, the completed plate may be molded with the wings 14 or strips 15 initially formed therein; and in this case it would be very easy not to limit the attachment of the wings 14 or strips 15 to the edges and ends respectively.

The slots 15 permit the free migration of the ions between the adjacent battery plates 12 and 13. The guard wings 14 or guard strips 15 at such openings, however, effectively prevent the active material from bridging across from battery plate to battery plate through such openings 11, because by reason of such guard wings or guard strips the path between battery plates is lengthened and made crooked so that any bridges which might tend to form would be so weak that they could not exist. To facilitate this free migration of the ions, more than half of the periphery of each wing or strip is cut free from the body of the separator, thus leaving less than half as attaching means.

If desired, the main slots 11 for permitting the ion migration may be supplemented by relatively small openings, preferably in the form of slits 16, formed in the plate 10, and if desired in the guard wings 14 or guard strips 15. These slits 16 are made so small, in at least one dimension, that no bridging of active material through them could be obtained.

Preferably, the projecting wings 14 and guard strips 15 are not projected sufficiently far to engage the adjacent face of the battery plates, but are spaced from such battery plates as shown in the drawings. In order to obtain this spacing, so that the wings or strips will not be subjected to pressure by any tendency of the battery plates to warp, I provide in the separator plates 10 suitable buttons 17 for engaging the battery plates. These buttons 17 project farther from the plane of the separator plates 10 than do the wings 14 or guard strips 15, and project from each plate 14 on both sides thereof when a separator is formed of a single plate, though obviously only from one side thereof when two plates are assembled to form a separator. The buttons 17 are preferably suitably located on the separator plate to prevent buckling or warping of the battery plates. As shown, large buttons are provided at the corners, where the greatest crushing force from warping of the battery plates is exerted, and small buttons are provided at one or more intermediate points for engaging the battery plates at other points than the corners. These, which are solid buttons, may be made of any convenient material suitably fastened in the separator plates; but preferably, especially when the plates are molded, are formed of the same material as the separator plates and are integral therewith, as illustrated in Figs. 1 and 5.

I claim as my invention—

1. A storage-battery separator, comprising a sheet of acid-resisting insulating material having openings formed therethrough and portions offset from the plane of the sheet at such openings to guard the latter against the formation of bridges therethrough, said offset portions having the larger part of their peripheries cut free from the body of the sheet.

2. A storage-battery separator, comprising a sheet of acid-resisting material having relatively long and narrow slots formed therethrough, and portions of the same material offset from the plane of the sheet but attached to the sheet and extending along such slots to guard them from the formation of bridges therethrough.

3. A storage-battery separator, comprising a plate of insulating material formed with openings therethrough and integral lateral projections offset from the plane of the plate on both sides at the openings through the plate to guard the openings against the formation of bridges therethrough.

4. A storage-battery separator, comprising a plate of insulating material formed with openings therethrough and integral lateral projections parallelly offset from the plane of the plate at the openings through the plate to guard the openings against the formation of bridges therethrough, said projections being cut free from the plate body on opposite sides.

5. A storage-battery separator, comprising a sheet of acid-resisting material having openings formed therethrough and portions offset from the plane of the sheet at such openings to guard the latter against the formation of bridges therethrough, said sheet being provided with buttons which project laterally therefrom farther than do said offset portions to abut against the adjacent battery plates.

6. A storage-battery separator, comprising a sheet of acid-resisting material having openings formed therethrough and portions offset from the plane of the sheet at such openings to guard the latter against the formation of bridges therethrough, said sheet being provided with buttons which project laterally therefrom to abut against the adjacent battery plates.

7. A storage-battery separator, comprising a pair of plates of acid-resisting material each having openings formed therethrough and offset portions at such openings to guard the latter, said plates having their openings registering, said offset portions of each plate having the larger part of their peripheries cut free from the body of such plate.

8. A storage-battery separator, comprising a pair of plates of acid-resisting material each having openings formed therethrough and offset portions at such openings to guard the latter, said offset portions of each plate having the larger part of their peripheries cut free from the body of said plate.

9. A storage-battery separator, comprising a sheet of acid-resisting material having openings formed therethrough and portions offset from the plane of the plate at such openings to guard the latter against the formation of bridges therethrough, said plate being provided with integral buttons which project laterally therefrom to abut against the adjacent battery plates.

10. A storage-battery separator, comprising a sheet of acid-resisting material having openings formed therethrough, some of said openings being relatively much larger in their minimum dimension than others, and said sheet being provided with portions offset in the plane of the plate at the larger openings to guard the latter against the formation of bridges therethrough.

In witness whereof, I have hereunto set my hand at Indianapolis, Indiana, this 15th day of May, A. D. one thousand nine hundred and twenty.

DANIEL A. GRIEB.